Oct. 13, 1970

K. T. LIAN

3,534,226

SEQUENTIAL SWITCHING CIRCUIT BREAKER FOR HIGH POWER
AC OR DC POWER TRANSMISSION CIRCUITS

Filed Nov. 9, 1967

INVENTOR.
KENNETH T. LIAN,
BY
Allen A. Dicke Jr.,
AGENT.

United States Patent Office 3,534,226
Patented Oct. 13, 1970

3,534,226
SEQUENTIAL SWITCHING CIRCUIT BREAKER FOR HIGH POWER AC OR DC POWER TRANSMISSION CIRCUITS
Kenneth T. Lian, Thousand Oaks, Calif., assignor to Hughes Aircraft Company, Culver City, Calif., a corporation of Delaware
Filed Nov. 9, 1967, Ser. No. 681,632
Int. Cl. H01h 9/34; H02h 7/22
U.S. Cl. 317—11                                9 Claims

ABSTRACT OF THE DISCLOSURE

An arrangement of series connected switches and resistors is paralleled across the contacts of a mechanical interrupter which is inserted into the line to be protected. In normal operation, all switches are closed. Upon the occurrence of a circuit fault, the interrupter contacts begin to separate and this initiates the sequential opening of the switches. These switches open such that an increasingly larger resistance is inserted in series with the transmission line. Sequential switching devices can also be used to connect power to a load.

BACKGROUND

This invention relates generally to electrical switching and in particular to a sequential switching system applicable to both DC and AC transmission systems for such applications as circuit breakers, circuit interruption, lightning arrestors, surge suppressors and load connection. In recent years, there has evolved a tremendous interest in the development of circuit breakers for both AC and DC power transmission circuits. For AC, the relative slow speed of existing devices (2–3 cycles on a 60 cycle basis) introduces a restriction on the size of power systems which can be considered since the larger the system, the greater short circuit rating of the system. Thus, it becomes imperative to remove the fault as quickly as possible, so that the transmission and generation circuit components will not be exposed to excessively large surges of current. A similar case occurs when a large load is to be connected, because of the transients involved with direct connection of a large load to a power source. This large load may be either an individual load, or may be a transmission line together with all of its associated inductance and capacitance. Such connections cause large transients in both AC and DC systems.

In the case of DC, the lack of a suitable circuit breaker essentially limits the potential of DC for power transmission. The major portion of the remaining specification will be directed primarily to the preferred embodiment of the present invention which is its use as a DC circuit breaker. In order to function properly, a DC circuit breaker must: (1) interrupt a DC current. This requires the dissipation of an energy several times the inductive energy stored in the interrupted circuit, (2) interrupt the DC current in such a manner that the circuit is not subjected to intolerable over voltages, (3) when the current is interrupted, withstand the full circuit voltage without restriking (i.e., without passing current again), and (4) not introduce appreciable power loss during normal operation.

A DC circuit breaker of the high pressure arc variety relies on the fact that, as the contacts separate, the volage required to sustain the current in the arc increases with increasing contact separation. Thus, as the contacts separate, an increasing resistance is placed in series with the remainder of the circuit. If the contacts are separated with the proper temporal variation, the inductive energy stored in the circuit can be dissipated in the arc without causing any significant over-voltages in the interrupted circuit.

One of the main difficulties associated with the design of such high pressure arc circuit breakers for high voltage DC power systems is that the voltage drop per unit length of arc is of the order of 200 volts per centimeter. Thus, to interrupt a 100 kv. circuit, the contacts must separate a distance of 5 meters and do this in times of the order of tens of milliseconds. This voltage drop per unit length can be improved by immersing the arc in a high pressure jet of oil, and artificially increasing the arc length per unit length of contact travel by positioning lateral fins adjacent the arc path. However, the problem still remains formidable. In addition to the above difficulty, the device must absorb an energy several times the total inductive energy stored in the transmission system. For modern DC systems under normal operating conditions, this energy may be in excess of $10^6$ joules. It may go up to $10^8$ joules or more under short-circuit conditions.

The use of high voltage direct current systems can lead to important cost savings in power transmission and distribution; they can also lead to increased system stability. A full realization of the potential of high voltage direct current systems requires two major steps beyond the present state of the art. The first is the development of less expensive and more compact switch tubes and converter stations; the second is the development of high voltage direct current switch gear (interrupters, load disconnect switches, circuit breakers and lightning arrestors).

SUMMARY

According to the present invention, DC switch gear employs these devices in a sequential switching system which provides the following advantages:

(1) Fast acting, electronic interrupting devices can be used in the circuit without leading to excessive over-voltages.

(2) The energy dissipated within these fast acting interrupting devices can be reduced to a small fraction (typically $\frac{1}{1000}$) of the total fault energy.

(3) Over-voltages during current interruption can be controlled either by choosing beforehand an appropriate sequence for the insertion of resistance or by the use of logic circuit control of resistor insertion.

As stated above in the abstract of the disclosure, the sequential switching system of the present invention employs, for example, a parallel circuit arrangement of series connected resistors and switches connected across the contacts of a conventional mechanical DC circuit interrupter. Upon normal operation, the contacts of the circuit breaker are closed as are all the switches. In this condition, the voltage drop across the circuit breaker including the switches connected in parallel with the mechanical interrupter is virtually zero because of the closed condition of the contacts of the conventional mechanical DC circuit interrupter. Upon sensing a circuit fault, or for any other reason when it is desired to open the circuit, the contacts of that circuit interrupter are made to separate.

On separating, an arc will develop between the contacts to preserve the current flow, and as the contact spacing increases the voltage required to sustain this arc increases. Since the switches are all closed initially, the contracts will have in parallel with them a group of parallel connected resistors. By appropriate choice of resistance values, the resistance of this group can be so low that the arc between the contacts can be extinguished at low voltage. Once the interrupter contacts are sufficiently open so the arc cannot restrike, the switches sequentially begin to open in such a manner that an increasingly larger resistance is placed in series with the transmission line. With the proper choice of resistance and switching times the voltage surges on the line can be limited to safe levels determined by the surge over-voltage factor $k$. The value of the last resistance in the group can be chosen so that when the last switch is opened, in order to bring the current to zero, a voltage surge suppressor of economically feasible rating can be inserted and hold the voltage excursion within the set limits.

It is therefore a primary object of the present invention to provide an electric switch which has a high degree of reliability and long life and which presents only negligible power loss during normal operation and which provides relatively fast initiation of circuit breaking action (approximately ¼ cycle on a 60 cycle per second basis), and which provides votlage recovery rates which far exceed those available with present mechanical circuit breakers and interrupters.

DESCRIPTION OF THE DRAWINGS

FIG. 15 is a graph illustrating a typical current versus time curve after occurrence of a short in a system having the sequential switching circuit breaker of this invention.

DESCRIPTION

Since the preferred use of the present invention is as a DC circuit breaker, some preliminary discussion of the function which a DC circuit breaker must provide will be given. In order to function properly a DC circuit breaker must meet the following requirements:

(1) It must not introduce appreciable power loss during normal conductive operation. It must perform the conductive function with the ultimate in reliability since even a momentary interruption of the circuit can produce intolerable over-voltages in the transmission system.

(2) It must minimize the time required to limit the peak current during the fault. The faster the circuit breaking action proceeds the smaller the peak fault current will be.

(3) It must interrupt the circuit current. This requires the dissipation of an energy several times the inductive energy stored in the interrupted circuit. For the case of AC, advantage can be taken of the fact that the current and therefore the stored magnetic energy will equal zero every half cycle. However, in AC applications, if fast-fault limiting is desired, it may be necessary to begin the fault limiting process before a current zero occurs. This would require the dissipation of the stored magnetic energy.

(4) It must interrupt the circuit in such a manner that the circuit is not subjected to intolerable over-voltages.

(5) When the current is interrupted, it must withstand the full circuit voltage without restriking (i.e., without passing current again).

Figure 1:
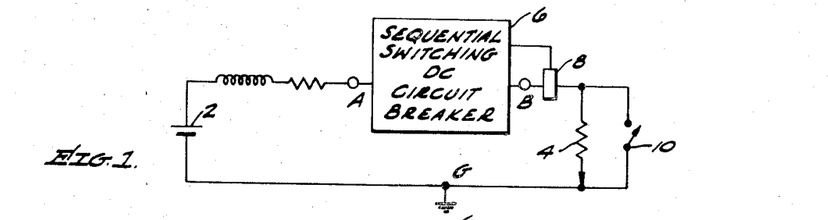
FIG. 1 is a simplified schematic circuit representation of an electric power system incorporating the circuit breaker of this invention.

For the applications considered, faster voltage recovery rates are required than are achievable with state-of-the-art mechanical circuit breakers. FIG. 1 illustrates a simplified circuit representation of a shortable power system, in order to show the application of a sequential circuit breaker according to the present invention. FIG. 1 shows a DC power supply 2 connected in series with load 4. The sequential switching circuit breaker 6, according to the present invention, is inserted in series with the load 4. A sensor 8 is inserted in series with a sequential switching circuit breaker 6 in order to sense any fault in the line. The sensor is connected to the sequential switching circuit breaker. The sensor 8 may be any one of a variety of well-known types of sensors such as over-current, undervoltage, overvoltage, current change with respect to time or a combination of several of such sensors. In AC applications it may also incorporate over- and under-frequency sensing. Assume that a short circuit occurs at time $t=t_0$. The occurrence of a fault would be represented by the closing of a switch 10. At such time the current in the line begins to increase since the current is no longer subject to load 4. The sensor 8 senses the increase in the current and initiates action of the sequential switch circuit 6.

Figure 2:
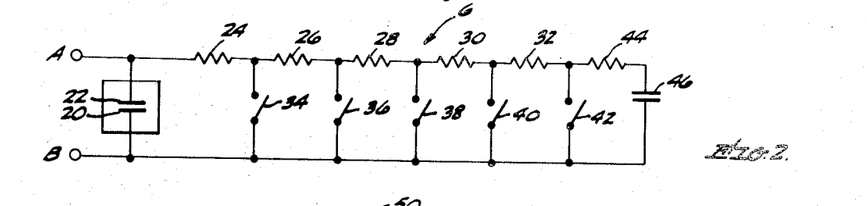
FIG. 2 is a schematic circuit diagram of the preferred embodiment of the sequential switching circuit breaker of the present invention.

FIG. 2 illustrates a preferred embodiment of the sequential switching system of the present invention. The sequential switching circuit shown in FIG. 2 comprises a conventional mechanical DC circuit interrupter 20 which includes a pair of circuit interrupter contacts 22. The circuit interrupter 20 is inserted into the DC transmission line between the terminals A and B. Connected to terminal A, and to one side of interrupter 20, are series connected resistors 24, 26, 28, 30 and 32. Switch 34 is connected on one side between resistors 24 and 26 and on the other side to terminal B into the other side of interrupter 20. Similarly, switches 36, 38, 40 and 42 are respectively connected after resistors 26, 28, 30 and 32 on one side, and on the other side are connected in parallel to terminal B. Parallel to switch 42 are series connected resistor 44 and capacitor 46.

In normal operation, contacts 22 are closed to provide a very low power loss interconnection between terminals A and B. Also closed are switches 34, 36, 38, 40 and 42. By choice of resistor 24, the voltage across the arc developed as contacts 22 are opened can be very low so that the arc can be quickly extinguished. Since the switches 34 through 42 are all closed, when the contacts 22 are initially opened, a fairly low resistance shunt current path is provided for those contacts. Once the contacts 22 are open and the arc thereacross extinguished, the switches 34 through 42 are sequentially opened so that an increasingly larger resistance remains in series with the transmission line. With proper choice of resistance and switching times, the voltage surges on the line can be limited to safe values determined by the surge over-voltage factor. By means of this increasing resistance in the circuit, the fault current is reduced to such a value that when the last switch 42 is opened, the remaining line energy can be absorbed in the surge suppressor comprising resistance 44 and capacitor 46.

Figures 3, 4:
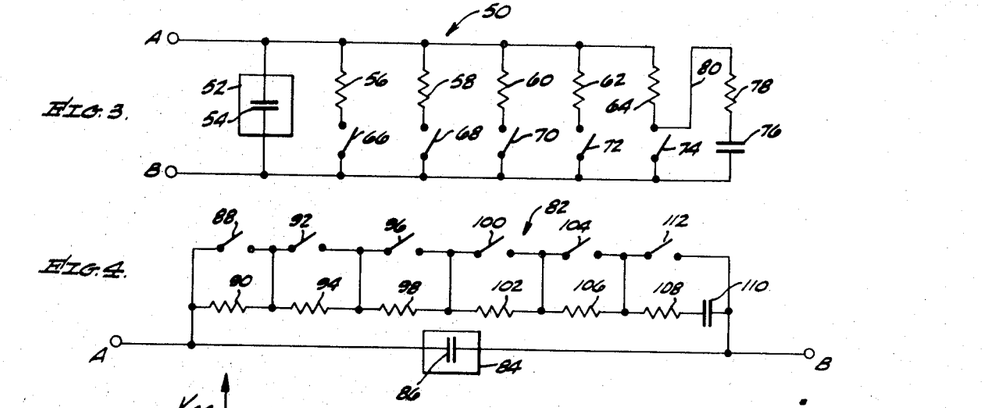
FIG. 3 is a schematic circuit diagram of another embodiment of the sequential switching circuit breaker of the present invention.
FIG. 4 is a schematic circuit diagram of another embodiment of the sequential switching circuit breaker of the present invention.

FIG. 3 shows another embodiment of the sequential switching circuit breaker which is generally indicated at 50. It includes a conventional mechanical interrupter 52, or the like, which has contacts 54. The contacts 54 are connected to terminals A and B. Also connected to terminals A and B in a parallel circuit arrangement with respect to the contacts 54 of the interrupter is a parallel circuit arrangement of resistors 56, 58, 60, 62 and 64 respectively connected in series with switches 66, 68, 70, 72, and 74. Capacitor 76 is connected in series with resistor 78 and this series combination is connected in parallel across switch 74 by line 80.

Under normal operating conditions the contacts 54 of the mechanical interrupter 52 are closed as are all of the switches 66 through 74. In this condition the voltage drop across the device is that associated with the contacts 54 of the mechanical interrupter 52. Upon sensing a circuit fault, the contacts of the interrupter 52 are made to separate. On separating, an arc will develop between the contacts 54 to preserve the current flow, and as the contact space increases the voltage required to sustain this arc increases. Since the switches 66 to 74 are all initially closed, the contacts 54 will have in parallel with them a group of parallel connected resistors 56 through 64. By appropriate choice of resistor values the net resistance of this group can be so low that the arc between the contacts 54 can be extinguished at a low voltage. Once the contacts 54 are open and the arc thereacross extinguished, the switches 66 through 74 are sequentially opened in such a manner that an increasingly larger resistance remains in series with the transmission line. With proper choice of resistances and switching times the voltage surges on the line can be limited to safe levels determined by the surge over-voltage factor $k$. The over-voltage factor $k$ is a function of the line, load characteristics and insulation level of the system. The value of the last resistance 64 in the group should be chosen so that when the last switch 74 is opened, the surge suppressor comprising resistor 78 and capacitor 76 of economically feasible rating can hold the voltage excursion within tolerable limits.

As an additional embodiment, a series circuit arrangement of parallel connected switches and resistors can also be used. The choice of arrangement, or any combination thereof, is dependent upon the characteristics of the switches. Since all physical switches can interrupt a current against only finite values of voltage rate of rise (volts per second), it may be necessary to shunt each switch with capacitors. Since the switching devices which are useful for the sequential switching circuit of the invention have recovery rates substantially equal to or faster than 1 kilovolt per microsecond, the ratings of these capacitors are economically feasible.

The number of switching stages required may be one or more, depending on the application. For example, in the case of an AC circuit breaker, if the permitted fault clearing time is long enough, one switching stage is entirely feasible since the transmission circuit will provide the requisite current zero.

FIG. 4 shows an embodiment of the present invention which employs a series circuit arrangement of parallel connected switches and resistors described above. FIG. 4 shows a sequential switching circuit breaker 82 which is connectable between points A and B in a circuit such as the circuit shown in FIG. 1. The circuit breaker 82 has a circuit interrupter 84 which includes contacts 86. The circuit interrupter 84 and its contacts 86 are identical to the interrupter and its contacts 22. In parallel to the contacts 86 are series connected resistances with paralleled switches. Switch 88 is connected in parallel with resistance 90. Switch 92 is connected in parallel with resistance 94. Switch 96 is connected in parallel with resistance 98, switch 100 is connected in parallel with resistance 102 and switch 104 is connected in parallel with switch 106.

Additionally, connected in series with the switch and resistor parallel pairs are resistor 108 and capacitor 110. These serve for voltage surge suppression. They are paralleled by switch 112, which is the last switch to open, upon action of the circuit breaker to open the connection between the circuit breaker connection points A and B. These series connected switch and resistor parallel pairs and surge suppressor are connected in parallel to contact 86. As previously discussed, proper selection of the values of resistances 90, 94, 98, 102, 106 and 108, as well as capacitor 110 will keep the surge of voltage within reasonable limits upon opening of the contacts 86 and thereafter the switches. The control of the contacts 86 and the switches 88, 92, 96, 100, 104 and 112 are under the control of the sensor, similar to the sensor 8.

Figure 5:
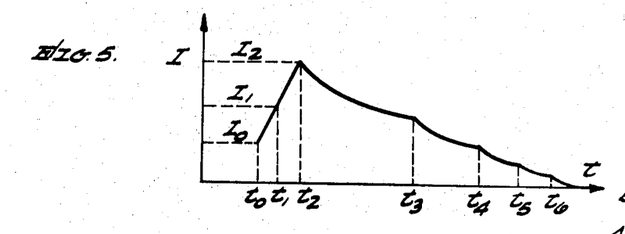
Figure 6:
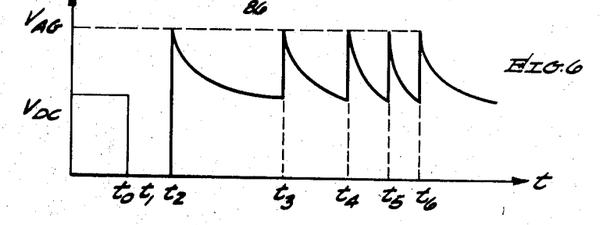
FIG. 6 is a graph showing a typical voltage versus time curve after occurrence of a short in a system having the sequential switching circuit breaker of this invention.

FIGS. 5 and 6 are graphs showing the typical time sequence after the occurrence of a short for the sequential switching circuit breaker of the present invention. FIG. 5 shows what happens to the current upon occurrence of a short circuit and upon initiation of the current interruption by the circuit breaker of the present invention. FIG. 6 shows what happens to the voltage upon occurrence of the same circuit fault and upon activation of the circuit breaker of the present invention. Along the abscissa of the graph in each of FIGS. 5 and 6 are found points $t_0$, $t_1$ through $t_6$. The time $t_0$ indicates the occurrence of a short circuit. The times indicated by $t_1$ through $t_6$ indicate the time at which the interrupter and switches are opened. Referring to the circuit of FIG. 2, interrupter 22 starts opening at time $t_1$ and is completely opened and its arc deionized at time $t_2$, switch 34 is opened at time $t_2$, and switch 36 is opened at time $t_3$. Switch 38 is opened at time $t_4$, switch 40 is opened at time $t_5$ and switch 42 is opened at time $t_6$.

In FIG. 5, the normal current in the transmission line is indicated as $I_0$. At time $t_0$ the short circuit occurs and the current increases until it reaches a value indicated as $I_1$, at which time interrupter 20 in FIG. 2 is opened, leaving in the transmission line the resistance value of resistors 24 through 32. The current continues to rise, because of the low value of resistance 24, until switch 34 is opened at time $t_2$. The current then is reduced, falling with the opening of each switch until the current reaches zero.

In FIG. 6 the normal operating voltage falls to zero at time $t_0$. At time $t_2$, the voltage increases drastically upon the opening of switch 34. The voltage rises to a value of $V_{ag}$, which is $k$ times the supply voltage, which value then begins to decrease until time $t_3$ at which the switch 36 is opened which increases the resistance between points A and B. With this increase in resistance the voltage increases back up to $V_{ag}$ again and so on. The operation of the circuit of FIG. 3 is very similar to the circuit of FIG. 2.

The operation of the sequential circuit breaker 82 of FIG. 4 is similar. While conducting current under normal load conditions, the interrupter contacts 86 are closed, switches 88, 92, 96, 100 and 104 are closed to shunt across their respective resistors, and switch 112 is closed to short capacitor 110. When a fault is detected by means of a sensor similar to sensor 8, the sensor circuitry indicates to the circuit breaker 82 that the circuit is to be broken.

Upon this event, contacts 86 in interrupter 84 are opened. In view of the fact that there is a complete shunt circuit around the contacts 86 through the closed switches 88, 92, 96, 100, 104 and 112, there is little voltage drop across the contacts 86 as they open. The only voltage drop present is that associated with the enumerated series connected switches. Thus, there is little arcing when interrupter contacts 86 are opened. The amount of arcing can be easily handled by the type of interrupter that is commercially available.

The arc caused by opening interrupter contacts 86 is permitted to deionize before further steps are taken in order to prevent restriking of the arc. Thereupon, the switches 88 through 104 are sequentially opened. The switches are arranged in parallel around the resistances 90 through 106 so that the opening of each of these switches inserts into the circuit the respective resistances. The switch opening times and resistance values are chosen in such a manner that the voltage surges upon each switch opening are maintained within the tolerable limits. Thus, the current and voltage curves are represented by FIGS. 5 and 6.

The physical devices performing the functions of the switches in FIGS. 2, 3 and 4, for the purposes of discussion, are idealized as follows. In the closed position, their impedance is zero and in the open position, their impedance is infinite. The transition between the two states takes place in zero time. The validity of these assumptions, with respect to the physical switches being considered for use in the present invention, can be illustrated by considering, as an example, the liquid metal cathode vacuum arc interrupter described in patent application Ser. No. 720,695, filed Apr. 11, 1968, entitled "Liquid Metal Arc Switching Device," invented by Wilfried O. Eckhardt, which specification is incorporated herein in its entirety by this reference. (1) During conduction, the voltage drop across the switch device will never exceed a few hundred volts at most. Thus, in comparison to the series resistors, the device impedance is negligible. (2) When the device has interrupted the current, the space between the electrodes is essentially a high vacuum. Thus, after interruption, the impedance of the device is essentially infinite. (3) With the liquid metal cathode interrupter, the transition time is estimated to be in the order of microseconds. In comparison to the circuit time constants, this is negligible.

Figure 7:
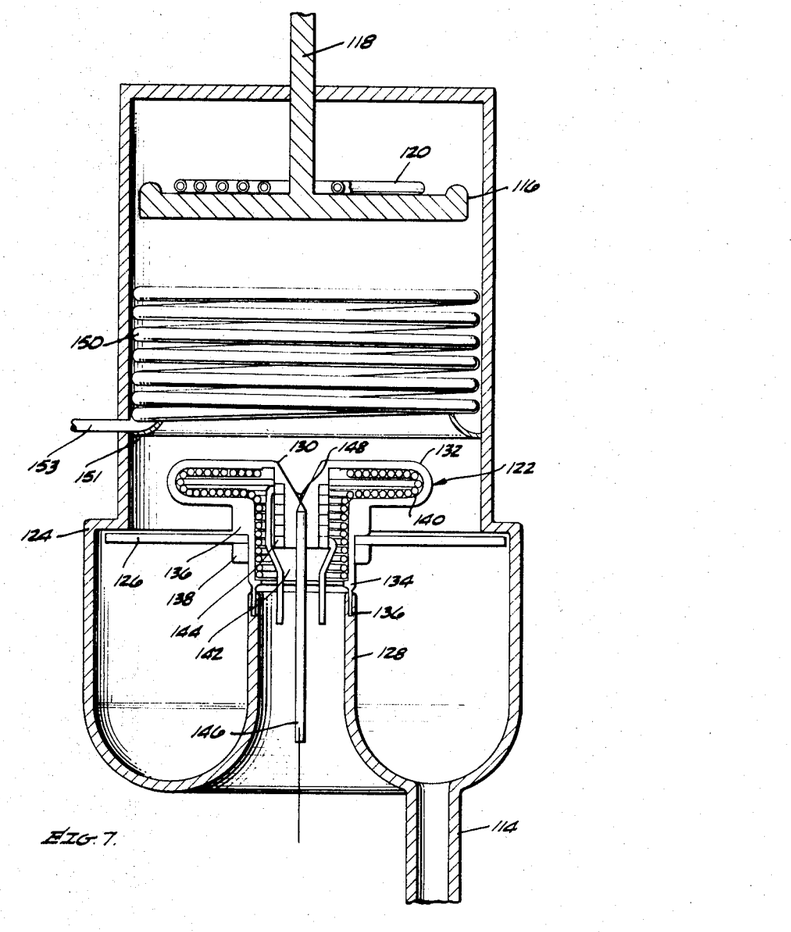
FIG. 7 is a longitudinal section through a liquid-metal arc switching device.

Referring to the drawings, the liquid-metal arc switching device is generally indicated in FIG. 7. The general term "switching device" is used to generally describe a device which is capable of initiating and/or interrupting current flow in a circuit. This includes circuits wherein the current reaches a natural zero by means independent of and exterior of the switch tube, as well as devices in which the current zero is accomplished by the switch tube by an increase in voltage thereacross by arc cessation. The first case includes rectification of alternating current, and the second case includes DC circuit breakers and commutators for converting DC to AC. Thus, the device itself inherently interrupts current flow upon voltage reversal and can be operated to interrupt current without current or voltage reversal. For these reasons, the term switch device is used generically to define the scope of such devices.

The switch device includes an envelope which serves as a vessel or a tube within which the primary components of this switch device are located. Vacuum pump connection 114 is provided on the envelope to either originally pump down the original non-condensable gases after manufacture, whereupon it is sealed, or can be continuously pumped to maintain the desired low background pressure of non-condensable gases.

Anode 116 is positioned within the envelope and has an external connector which extends externally of the envelope for electrical connection. Anode 116 is shown as being in the shape of a flat circular disc so that a maximum area is exposed to the electrically conducting plasma. Anode 116 is preferably provided with heat exchanger 120. Heat exchanger 120 controls the temperature of anode 116 to prevent extreme temperature excursions. Anode 116 is preferably maintained at a temperature above the condensation temperature of the liquid metal, hereinafter described, so that condensation does not occur thereon. Such condensation leads to arc back situations, and is thus undesirable. Heating of the anode is caused by its absorption of the kinetic energy of the plasma particles, by the recombination energy of electrons and ions, and by the $I^2R$ drop of the current flow through the anode material. Thus, at high currents, cooling may be necessary through heat exchanger 120 to prevent the anode from reaching destructive temperatures. On the other hand, at low loads, heating by means of heat exchanger 120 may be necessary to maintain anode 116 above the liquid-metal condensation temperature. Heat exchanger 120 is conventionally externally connected and is controlled by any convenient temperature sensing means responding to the temperature of anode 116.

Envelope 112 is made, at least partially, of insulative material to provide electrical separation of the envelope walls between anode 116, condenser 150 and cathode 122. The envelope extends downwardly, as shown in the drawing, from anode 116 to below cathode 122. Offset 124 provides an internal offset adjacent which insulating disc 126 is positioned. Envelope 112 continues downward below offset 124 as a cylindrical tube, and curves inward and upward to form tubular re-entrant section 128.

Cathode 122 is made of a metal which is a high arc voltage material, as compared with the liquid metal used in connection with it. The term "arc voltage" is defined as arcing voltage in Proceedings of the Institute of Electrical Engineers, vol. 110, No. 4, April 1963, pp. 796–797, section 4.6. Furthermore, the metal of the cathode structure must be compatible with the liquid metal. Cathode 122 has pool retaining walls 130 against which the liquid metal is located and against which the arc runs, at the juncture or junctures between walls 130 and the liquid metal. Above the walls, cathode 122 has a front face 132, which is substantially in the form of a planar disc. Below the front face 132, cathode 122 extends downwardly in a reduced diameter tubular neck 134 which is sealed to tubular re-entrant section 128 of the envelope by means of an appropriate seal joint 136. In the embodiment shown, cathode 122 has a shoulder 136 positioned between the larger diameter front face and neck 134. Insulating disc 126 rests against this shoulder and is maintained in place by retainer 138. Other geometries of wall 130 than the one shown in the drawings can also be employed.

Heater 140 is located within the hollow interior of the cathode behind front face 132, and extends around the outer periphery, down inside of shoulder 136 and into neck 134 so that the entire exposed area of the cathode away from walls 130 can be controlled in temperature. The central portion of the cathode, below the recess formed by walls 130, extends downward to form neck 142, and heat exchanger 144 is positioned exteriorly of the neck. Both heater 140 and heat exchanger 144 have suitable connections extending downward within tubular re-entrant section 128 to permit external connection and temperature control. If desired, temperature sensors can be mounted so that accurate temperature determinations of the respective portions of the cathode 122 can be made.

The liquid metal required on the surface of the cathode structure for arcing can be provided either by feeding of metal in the liquid state or by intermediate vaporization and recondensation.

The term "liquid metal" is used to define those metals which are liquid at or just somewhat above room temperature. While called liquid metal, the metal is not necessarily in the liquid state when fed to walls 130, which define pool-keeping surfaces. Mercury is a convenient liquid metal, because it is normally liquid at room temperatures. Furthermore, it has a suitably low arc voltage. Thus, the arc preferentially strikes upon the liquid metal when the external surfaces of cathode 122 are formed of a relatively high arc voltage material. Additional materials which are suitable to act as the liquid metal fed to cathode 122 are exemplified by cesium, lithium and gallium. If necessary, liquid-metal feed line 146 and associated equipment to provide the liquid metal thereto can be heated to maintain the liquidity or vapor state of the liquid metal.

As indicated, cathode 122, as well as anode 116, are preferably formed of high arc voltage materials. When mercury is employed as the liquid metal, molybdenum serves as a suitable material for the anode and cathode. Liquid-metal feed line 146 extends from a source of liquid metal of such nature as to provide the proper flow rate of liquid metal to cathode 122, as hereinafter described. Liquid-metal feed line 146 extends up through the re-entrant section 128, and in the example of the drawings, is connected centrally of cathode 122 to feed the liquid metal to the space defined between walls 130. If desired, a suitable flow restriction 148 can be positioned at the lower juncture of walls 130 with the opening therebelow connecting to feed line 146 to impede liquid-metal flow to the space defined between walls 130. When liquid metal is fed to the space in its liquid state, a porous flow restriction is desirable, for it prevents an arc from extending down into the feed line when the pool between walls 130 is exhausted. However, when the liquid metal is fed in vapor form, a flow restriction in the form of a capillary passage is preferred, with the capillary somewhat larger than the passages through the porous mass employed in the example for liquid feeding.

Additionally, within the envelope, condenser 150 is located. It serves as one means for continuously removing from the tube the metal vapor emitted by the cathode. Condenser 150 is suitably externally connected to maintain the desired temperature upon the condenser surface, as described below. When condenser 150 is maintained at a temperature to condense the metal to the liquid state, it is collected by trough 151, and can be recirculated to the cathode. In the case of recirculation of the liquid metal, an appropriate isolator is required in the recirculation line.

The pressure within the envelope is pumped down through a vacuum pump connection 114, before the device is put into use. In some cases, when the contents of the envelope have a minimum of out-gassing, the envelope can be sealed by closure of connection 114. In other cases, it may be desirable to keep the connection with a vacuum pump so that non-condensables can be pumped down when operation of the device so indicates.

The arc is initiated by any convenient means. No specific arc initiator is disclosed in the drawings, but those well known in the art can be used. Examples of such are auxiliary electrode igniters, semiconductor igniters and the like. Alternatively, a laser igniter directed onto the liquid-metal surface is suitable, as is an igniter which emits a puff of liquid-metal plasma into the space between the anode and the cathode to initiate arcing.

Presuming that a suitable voltage is applied across the anode to cathode space, and liquid metal is available on the cathode walls 30, the ignition of the device will cause conduction. The amount of liquid metal available on walls 130 for evaporation is kept purposely low so that the electron to atom ratio is high. As a consequence, the pressure in the envelope will remain relatively low, even during conduction. A typical range for mercury as the liquid metal is from $10^{-2}$ to $10^{-6}$ torr.

Heater 140 maintains the face of the cathode sufficiently high that liquid-metal condensation cannot occur there. Similarly, the temperature of the pool-keeping walls 130 is controlled by heat exchanger 144. In cases where a liquid-metal pool is desired, heat exchanger 144 cools the pool-keeping walls to prevent excessive evaporation, especially in the case of high currents where the arc introduces a considerable amount of heat into the pool-keeping structure. In cases where the arc current is low, it may be necessary to heat the pool-keeping walls, especially in the case where the liquid metal is fed in vapor form to the walls 130. In such a case, the walls 130 are preferably slightly above the equilibrium condensation temperature of the liquid metal vapor at that pressure. Thus, only transient condensation can occur. Transient condensation, in this sense, is a situation wherein slightly superheated metal vapor deposits upon the wall in a thin film over a portion of the area, with such condensation occurring for a short time. However, since the surfaces are above the equilibrium condensation temperature, no condensation of droplets or masses of metal occurs. Instead, liquid metal is continuously deposited and evaporated off, and occupies only a portion of the wall area at any one time.

As stated above, heat exchanger 140 keeps the remainder of the cathode above condensation temperature to prevent metal pools from forming thereon to prevent the arc from acting on any surface but the walls 130. In addition, the heating prevents metal condensation at the juncture between neck 134 and tubular re-entrant section 128, for arcing at this juncture would be destructive. Additionally, insulating disc 126 prevents any appreciable quantity of the metal vapor from reaching that juncture in order to prevent the destructive arcing.

Condenser 150 is positioned to condense metal vapor in order to prevent a buildup of vapor pressure within envelope 112. In the case of mercury, in order to maintain the metal vapor pressure within the tube in the absence of arcing below $10^{-5}$ torr, when it is desired to retain the condensed mercury in the liquid state, the temperature of condenser 150 is maintained at about 240 degrees K. When a lower pressure is desired, a lower condenser temperature can be used, resulting in solidification of the condensed mercury. In the latter case, the condenser can be periodically warmed to permit liquid mercury to drain out of the bottom of trough 151 through drain 153.

When the feeding of liquid metal is terminated and its supply at walls 130 is exhausted, the arc will cease, provided the rate of voltage rise across the tube is limited by the circuit to a value such that arc transfer from the low arc-voltage liquid metal to the high arc-voltage cathode structure cannot occur. For example, with mercury as the liquid metal and molybdenum as the cathode structure material, a rate of voltage rise of 10 kilovolts per microsecond has been found permissible. Similar rates of voltage rise were found permissible when the current interruption was caused by external voltage reversal.

Stopping the mercury feed is one way of interrupting the arcing. In addition, if the mercury is fed at a constant rate for a normal constant current, and a fault causes a rapid increase in current, it is clear that the liquid-mercury pool is rapidly consumed and arcing stops. Thus, the device is useful for automatically interrupting fault currents. Thus, the switching device can be switched off either upon the desire for such off switching or upon surge current conditions, and is effective in both modes, if desired, at the same time. On the other hand, if off switching is not desired with varying current, a current measuring device can measure the arc current and control the liquid metal feed rate so that an adequate amount of liquid metal for arcing can be maintained under varying current conditions. Of course, in such a case, a maximum permissible current can be selected with the liquid metal feed control limited to that amount, so that, even when variably feeding liquid metal under variable current conditions, a surge current beyond that permissible is not fed an adequate amount of liquid metal for arc maintenance and, thus, is starved. An example of the relationship between current and liquid metal feed rate is 1 cubic centimeter of mercury per hour per 100 amperes of discharge current. Another switch which may be used is the Magnetically Controlled Crossfield Interrupter and Switch Tube described in patent application Ser. No. 664,722, filed Aug. 31, 1967 by Michael A. Lutz and Ronald C. Knechtli, the disclosure of which is incorporated herein in its entirety by this reference; Ser. No. 664,722, the interrupter 202 (see FIG. 8) comprises a cylindrical cold cathode 204, which, in this embodiment, also forms the cylindrical wall of the interrupter envelope 206, and a cylindrical anode 210. The cylindrical electrodes 204 and 210 are coaxial and, together, define a gas-filled interelectrode space 208. The envelope 206 is closed at each end by end plates 212 and 214. The end plate 212 is provided with a tube 216 to provide gaseous connection between the space 208 and a pressure gauge (not shown). The metal plate 214 is provided with a gas inlet tube 218 and a vacuum port 220. A water cooling coil 222 spirally encircles the outer wall of the envelope 206. A magnetic field coil 224 is mounted externally of the envelope 206 for use in applying a magnetic field (indicated schematically by the dotted lines 226) having at least one component perpendicular to the electric field (indicated schematically by the arrows 228) between the anode 210 and cathode 204. The inlet, outlet, pump and heat exchanger for the water cooling coil 222 have been omitted from the drawing in the interests of clarity. The electrical lead 230 to the anode extends through the plate 214 and the anode mount 232. The cathode lead 234 is attached to the metal plate 214.

Moderately large cathode surface areas are required to carry sizeable currents at current densities small enough ($<25$ a./cm.$^2$) to avoid arcing because an arc is not extinguished by off-switching the magnetic field.

Figure 8:
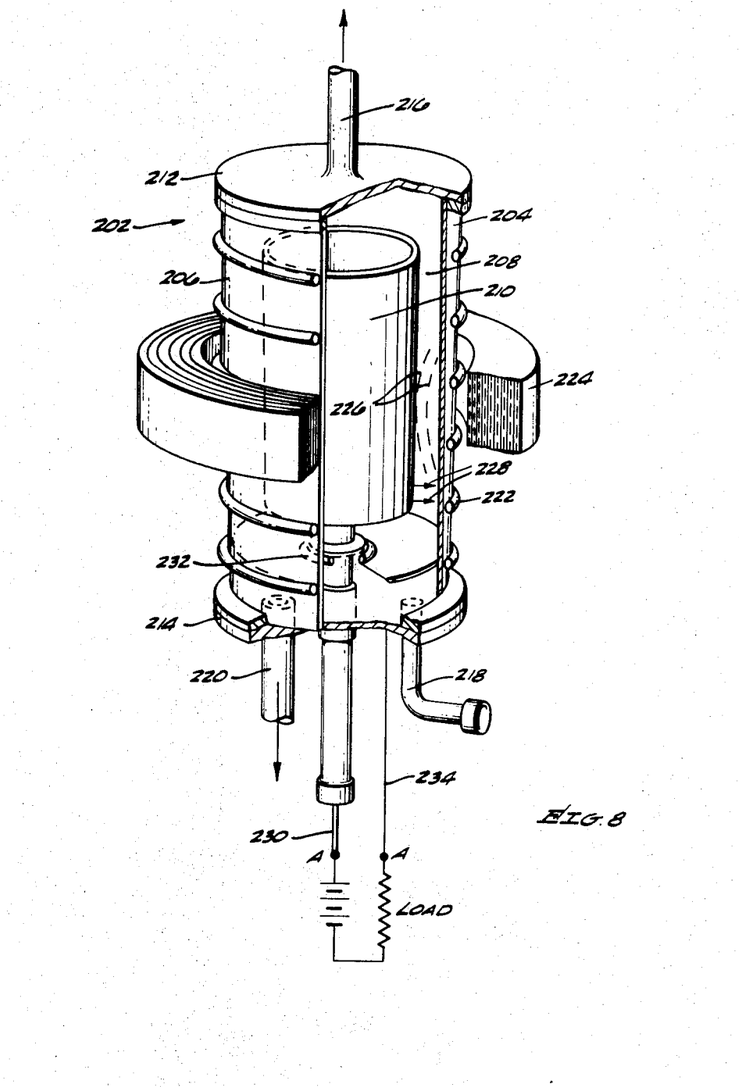
FIG. 8 is a longitudinal section through a magnetically controlled crossed field interrupter and switch tube.

It is within the state of the art to make the interrupter described in FIG. 8 to operate as a sealed-off unit. In such an embodiment, the vacuum port 220 and gas inlet tube 218 are deleted. The gas pressure can be regulated, for example, by using gas-loaded ribbons which establish and maintain a specified pressure upon application of a pre-determined heating power to the ribbons. It is to be understood that this feature of sealing off the device applies to all embodiments which are described in the following and we are not limited to the aforementioned method of pressure control.

An embodiment employing one or more magnetic field coils adjacent to the inner-electrode is feasible, in which case it may be desired to provide a slot in such electrode. It is to be understood that the spirit electrode can be used in any of the embodiments described in the present specification. In those embodiments in which the outer-electrode is also the envelope, then, obviously, if it were to be desired to provide a slit in the outer-electrode, certain modifications would have to be made, such as a separate envelope rather than relying on the outer-electrode, or rather than having an open slit making the slit out of an insulating material integral with the electrode.

The net magnetic field inside the interrupter is reduced to zero by passing a current through a bucking coil which is interleaved with the main coil 224. The bucking coil and its current are such as to produce a magnetic field which is equal in strength but opposite in direction to the field produced by the main coil 224. A preferred method for producing the bucking current is by triggering a thyratron to discharge a capacitor through the bucking coil. The signal which produces the triggering can be from any one of a number of known devices in the circuit in which the interrupter is connected which produce a signal in response to a circuit condition which requires that the current be interrupted. The bucking current is maintained by the auxiliary DC power supply which is switched in by an SCR. When conduction is again desired, the bucking circuit is opened by switching the supply off.

It is essential to the life of the tube that when the reduction in magnetic field be as rapid as possible when it is used at the high voltages for which the several tube embodiments of this invention are intended. If the reduction in magnetic field strength is comparatively slow, the voltage drop across the tube increases comparatively slowly, with consequent substantial energy absorption in the tube. Such causes heating, followed by metal-to-metal arcing with resulting inability to interrupt current flow. The off-switching, bucking coil circuit must be particularly arranged to quickly reduce the magnetic field below the critical value required for conduction. The circuit should have components which reduce the magnetic field below the critical value in less than one millisecond. It is believed that this is critical with tubes operating at the voltage and current given in this specification.

The maximum voltage hold-off capability of the apparatus of this invention can be determined by the use of a Paschen curve. This curve predicts the breakdown voltage for a pair of electrodes immersed in a specific kind of gas, the electrodes being separated by a distance $d$, and the gas being at a pressure $p$ (and with no magnetic field in the interelectrode space). The apparatus of this invention operates to the left of the Paschen minimum. That is, if it is desired that the interrupter or switch tube of this invention be able to hold off 25 kv., the product $pd$ must be made less than about 0.5, if helium, for example, is the ambient gas. If electrodes are parallel and spaced apart 2 cm. or less, the maximum pressure which can be used is about 0.25 torr, if breakdown in the absence of the magnetic field is to be avoided. Other switches which can be used are various vacuum switch tubes and transistor switches, or any device capable of interrupting and sustaining an interruption of current. Any of the above switches can be arranged in series if the voltage to be switched exceeds the switching voltage of an individual switch, and can be arranged in parallel if the circuit current exceeds the current capability of an individual switch.

For DC devices, the device must indeed be capable of interrupting the circuit current. Since all physical switches can interrupt a current against only finite values of voltage rise (volts per second), in some cases it may be necessary to shunt each switch with capacitors. Since the switching devices which would be useful for the sequential switching circuit of the present invention should recover at rates equal to or faster than 1 kilovolt per microsecond, the ratings of these capacitors are economically feasible. The number of switching stages required may be one or more depending on the application. For example, in the case of an AC circuit breaker, if the required fault clearing time is long enough, one switching stage is entirely feasible since the circuit will provide the requiste current zero.

As can be seen from the above discussion, the energy absorption which is necessary when the circuit is opened is the problem and is solved by the present sequential switching circuit breaker. When line voltages may be as high or higher than 200 kilovolts, and particularly in a DC line where there is no natural voltage or current zero, the energy absorption from line disconnection must be taken in the circuit breaker equipment. However, presently known conventional mechanical DC circuit breakers, with high pressure arcs, have excessively long arc lengths before the circuit is broken by reason of the voltage and the energy in the circuit.

Ideally, with respect to the energy absorption in the circuit breaker equipment, the interruption should be instantaneous, for this eliminates the situation in which current is flowing across the increasing resistance in the breaker. Since switching times in the order of 10 microseconds are now available as described in the inventions identified above, the amount of energy dissipated within the switching equipment is thus held within tolerable limits. When switches of that speed are used in circuits having an energy in excess of $10^6$ joules, it becomes necessary to dissipate the inductive energy in the circuit elsewhere as described with respect to this invention. Thus, the criticality is in the area of switching time. When each of the switches which is related to an energy absorbing resistor can be opened in the order of tens of microseconds, the entire circuit can be opened between 1 and 300 milliseconds, depending upon the circuit inductance. This is well within the range of feasibility of use of this circuit for interrupting DC and sufficiently fast to hold fault currents within tolerable limits in the high voltage DC lines. In the case of alternating current, its inherent nature provides voltage and current zeroes. Present day interruption capabilities take advantage of these zeroes, for when the conventional AC circuit interrupter opens its contacts, arcing normally continues until a current zero is reached in the connected equipment. If the interrupter contacts are opened fairly wide by the time that zero is reached, the arc deionizes by the time opposite voltage build up occurs. If the contacts are still close together, the interrupter may conduct through a restruck arc for another half cycle. With the present invention, however, due to its high speed and capability of interrupting large current, AC lines can be opened between natural current zeroes. This is important in high voltage lines, for fault currents increase rapidly and can become quite large by the time the next current zero occurs. Thus, fault currents can be held at lower values in AC lines by opening the circuit before the next current zero is reached. To accomplish proper results by opening the several switches in the required order and at the proper time intervals, electronic control is necessary.

Criticality thus arises from a combination of inter-related factors. When the use of switches having a voltage recovery rate in the order of 1 kilovolt per microsecond are used in power transmission lines having voltages in the order of 200 kilovolts, the line energy must be absorbed principally outside of the switching devices. In order to limit the voltage transient peaks to a tolerable value and keep the energy absorbers of reasonable value, they are arranged so that they are progressively switched into the circuit to control and reduce the current while maintaining voltage transients at a level that can be tolerated by the system. These transient peaks are limited by the insulation characteristics found along the line. Furthermore, with this combination of factors, total interruption can take place within a time of 1 to 300 milliseconds.

A specific example of a circuit situation is given below. From this example it is clear that only with quick opening switches can the circuit be controlled. Referring to FIG. 1, exemplary values are as follows. The voltage $V_{DC}$ supplied by DC power supply 2 is 200 kilovolts. The normal current $I_0$ through load 4 is 1000 amperes. The resistance of load 4 is about 198 ohms. The inductance and resistance of the supply line are 1 henry and 2 ohms, respectively. Additionally, the interrupter 20 is a mechanical DC circuit breaker capable of interrupting 5000 amperes against 1 kv. If an allowable surge overload factor $k$ for the line and equipment of 2.5 is permissible, the interrupter 20 must be able to stand 500 kv. after it is opened and its arc deionized. For the interrupter 20, it is assumed that it requires 10 milliseconds from the time of the beginning of a fault to the beginning of the opening of its contacts 22, and an additional 10 milliseconds for the arc to be extinguished.

Under these circumstances, a fault occurs (represented by the closing of switch 10) at times $t_0$, see FIGS. 5 and 6. Since $t_1-t_0$ is very much smaller than the time constant of the circuit, $L/R$, the fault current when the contacts open at $t_1$ is approximately given by $$I(t) \approx I_L \left(1 - \frac{t_1-t_0}{L/R}\right) + \frac{V_{DC}}{L}(t_1-t_0)$$

Thus, by the time the contacts open at $t_1$, the fault current is approximately 3000 amperes.

Without detailed knowledge of the arc characteristics, the arc is difficult to accurately predict. Assuming the worst case, that the arc resistance is zero, the fault current increases during the arcing period from $t_1$ to the end of arcing in accordance with the equation given in the paragraph above. Thus at the end of the arcing period (.01 sec.) the fault current is approximately 5000 amperes.

In order to permit deionization of the arc area, resistance 24 is chosen to be zero, and a deionization period of 10 milliseconds is allowed before time $t_2$ when switch 34 is opened. By this time the fault current is about 7000 amperes. However, this zero value of resistance 24 permits the contacts 22 to open and the arc to deionize against less than 1 kv. for which they are rated.

At time $t_2$, which is .030 second after the beginning of the fault at time $t_0$, switch 34 is opened. The switching sequence of opening switches 34, 36, 38 and 40 must be done as quickly as possible, but each switch remains closed long enough for the voltage to substantially return to the value of the supply voltage. The time between switch openings is estimated to be three times the circuit time const. $L/R$. Thus: $t=3L/R_{in}$, where $R_{in}$ is the net value of the paralleled resistances remaining in the circuit.

The value of $R_{in}$ is determined by the allowable surge overvoltage. For a value of $k=2.5$, $R_{in}$ is 70 ohms with switch 34 opened. In the .043 second from $t_2$ to $t_3$ the current is reduced to 2900 amperes and switch 36 is opened.

Now the $R_{in}$ is 175 ohms, and in the .017 second from $t_3$ to $t_4$ the current is reduced to 1150 amperes. Upon opening of switch 38 at time $t_4$, $R_{in}$ is 440 ohms and in the .0068 second from $t_4$ to $t_5$ the current is reduced to 460 amperes. At time $t_5$ switch 40 is opened to leave 1100 ohms in the circuit, and in the .0027 second from $t_5$ to $t_6$, the current is reduced to 185 amperes.

Switch 42 is opened at $t_6$, placing the series combination of capacitor 46 and resistor 44 across the open contacts 22. The total time from the fault to the complete opening of the circuit is thus about .100 second, under the conditions assumed. For a lower value of $k$, more switches with series resistances would need to be paralleled across interrupter contacts 22 and the total time to open the circuit would be longer.

At the opening of switch 42 at time $t_6$, the energy stored in the line is about 20,000 joules and this can be absorbed in a capacitor 46 of the surge suppressor having a value of about 1 microfarad. The value of resistance 44 is chosen to limit oscillation and overvoltage, and provide a critically damped circuit.

The above specific example of the sequential switching circuit breaker shows energy absorbed in interrupter 20 is of reasonable value. The interrupter absorbs less than $7 \times 10^4$ joules, even though the maximum circuit energy to be dissipated is approximately $10^8$ joules.

The maximum energy is reached at time $t_2$. An estimate of the energy dissipated in switch 34 can be made after making the following assumptions. During the transition period of switch 34, the voltage across the switch is $k$ times the supply voltage and the current is 7000 amperes. Additionally, the transition period is 50 microseconds. Under these conditions the energy dissipated during interruption in switch 34 is $2.5 \times 10^5$ joules. The energy dissipated in the remaining switches is less than that dissipated in switch 34. The balance of the energy is dissipated in the resistors.

The amount of energy in a normally operating transmission line, whether it be DC or AC, is quite large. The capacitive and inductive charging of such a line places a large transient load upon generating equipment when a previously energized line is simply connected to a power source. The sequential switching circuit equipment of this invention is equally applicable to the energizing of such lines. From the above description of the manner of disconnection of large loads, it is easily seen that the procedure can be reversed for the charging of large loads. Furthermore, the same equipment can be used so that the sequential circuit breaker can be used for first energizing the line, and then later disconnecting the line. The disconnection can be either for routine causes or due to a line fault as described above. The values of the resistors chosen for the case of disconnection upon occurrences of a fault are also reasonable for use for the line charging operation. Thus, transients are minimized in such a connection operation.

The above example shows the worth of the sequential switching circuit breaker. The circuit breaker has negligible power dissipation during normal operation. Additionally, by fast switching most of the stored inductive energy can be dissipated in resistors and not in the switches.

This invention having been described in a preferred embodiment, and an additional embodiment having been disclosed, it is clear that this invention is susceptible to numerous modifications and changes within the ability of those skilled in the art and the exercise of the inventive faculty.

What is claimed is:

1. A DC circuit breaker, said circuit breaker being arranged to be connected into an electric circuit carrying electric current, said circuit breaker comprising:

a circuit interrupter, said circuit interrupter having contacts therein arranged to be mechanically closed to provide continuity through said circuit breaker and being arranged to be mechanically opened to prevent circuit continuity between said contacts, the improvement comprising:

at least one electronic switch capable of off-switching while direct current flows therethrough, a resistor connected to said electronic switch, said electronic switch and said resistor being connected to said circuit interrupter to maintain voltage across said contacts at a reduced value during opening of said contacts.

2. The circuit breaker of claim 1 wherein said switch and said resistance are connected in series with each other and said switch and said resistance are connected in parallel across the contacts.

3. The circuit breaker of claim 1 wherein said electronic switch and said resistance are connected parallel to each other and said parallel switch and resistance are connected in parallel with said interrupter contacts.

4. The circuit breaker of claim 1 wherein there are a plurality of electronic switches and a separate resistance connected to each of the said plurality of said electronic switches.

5. The circuit breaker of claim 4 wherein there are at least two electronic switches and there is a separate resistance connected in series with each of said electronic switches, each of said series connected electronic switches and resistances being connected in parallel to each other and being connected in parallel across said contacts of said circuit interrupter.

6. The circuit breaker of claim 5 further including a capacitor and a capacitor resistor, said capacitor and said capacitor resistor being connected in series and said series connector capacitor and capacitor resistance being connected in parallel with said circuit interrupter contacts.

7. The circuit breaker of claim 4 wherein a resistance is connected in parallel across each electronic switch, and each of said parallel connected switches and resistance is connected in series with each other to form a series network, and said series network being connected in parallel across said interrupter contacts.

8. The circuit breaker of claim 7 further including a capacitor, said capacitor being connected in series with one of said resistances.

9. The circuit breaker of claim 1 wherein said electronic switch includes first and second electrodes and conductivity of said switch is caused by ionic conductivity between said electrodes, said electronic switch further including means to terminate ionic conductivity between said electrodes to thus open said electronic switch, said termination means causing cessation of conductivity within about 10 microseconds.

References Cited

UNITED STATES PATENTS

| | | | |
|---|---|---|---|
| 1,563,833 | 12/1925 | Christensen | 200—144 |
| 3,118,102 | 1/1964 | Cable | 317—11 X |
| 3,401,303 | 9/1968 | Walker | 317—11 |

JAMES D. TRAMMELL, Primary Examiner

U.S. Cl. X.R.

200—144; 307—136